2,904,541

CONTINUOUS POLYMERIZATION PROCESSES AND RESULTING PRODUCTS

Gerald R. Barrett, Winchester, Mass., assignor to Monsanto Chemical Company, St. Louis, Mo., a corporation of Delaware No Drawing. Application December 23, 1953
Serial No. 400,121

13 Claims. (Cl. 260—80)

The present invention relates to a continuous process of polymerizing a monomer or monomers of polymerizable unsaturated organic compounds, and it more particularly relates to a continuous process of polymerizing one or more polymerizable unsaturated organic compounds in an inert liquid which is a solvent for such compounds but not a solvent for polymeric materials derived from such compounds. The present invention also relates to polymeric materials having novel physical properties.

It is one object of the present invention to provide a continuous process for polymerizing monomers of polymerizable unsaturated organic compounds and to reduce the costs of operation as compared with a batch process.

A further object of this invention is to provide a continuous process for polymerizing monomers of polymerizable unsaturated organic compounds in a non-polymerizable, inert liquid which is a solvent for the unsaturated organic compounds but is a non-solvent and non-swelling medium for the polymeric materials derived from such compounds.

A further object of the invention is to provide a continuous process for preparing polymeric materials of large particle size and high apparent density.

Still further objects and advantages of the present invention will appear from the following description and the appended claims. Before explaining in detail the present invention, however, it is to be understood that the invention is not limited in its application to the details described herein, since the invention is capable of other embodiments and of being practiced or carried out in various ways.

The processes of the present invention are carried out, in general, by continuously adding a polymerization catalyst, preferably a free radical catalyst or initiator, one or more monomeric polymerizable unsaturated organic compounds and a non-polymerizable, inert liquid which is a solvent for such compound or compounds but is a non-solvent and substantially non-swelling medium for polymeric materials resulting from the polymerization of such unsaturated compound or compounds, to a slurry, paste or suspension of a polymeric material obtained by the polymerization of such unsaturated compound or compounds, in a non-polymerizable, inert liquid which is a solvent for such unsaturated compound or compounds but is a non-solvent and substantially non-swelling medium for the polymeric materials, which liquid also contains a polymerization catalyst, preferably a free radical catalyst or initiator, and a minor proportion, for example, between 1 and 8% by weight of unreacted monomers. The temperature of the slurry or suspension is continuously maintained sufficiently high to effect reaction or polymerization between the monomers in the liquid thereby forming additional polymeric material which is insoluble in the liquid. A portion of the slurry is removed continuously from the reaction zone, or the main portion or body of the slurry. The amount of slurry removed over any one increment of time may be less than, equal to, or greater than the amount of monomer, catalyst, and liquid added to the main portion of the slurry over the same increment of time.

For ease of operation and most satisfactory results, it is preferred to withdraw or remove from the main portion of slurry, an amount of slurry which is substantially equal to the amount of monomers, catalyst and inert liquid added to the slurry, that is, the additions to and withdrawals from the main portion of slurry or suspension are preferably made at such a rate that the volume of the main portion of the slurry is maintained substantially constant. The minor portion or increment of slurry may be removed continuously from the main portion of slurry by a constant overflow arrangement or by gravity flow or a pumping arrangement which removes the slurry from any level of the main portion of the slurry. The polymeric material, in the slurry thus removed, is separated from the major portion of inert liquid, catalyst and unreacted monomer or monomers as by filtration, centrifuging or the like, and then subjected to a current of hot air, or steam, if the polymeric material is not water-soluble, to remove a substantial portion of the remaining liquid, monomers etc. The recovered liquid, monomers and catalyst may be, and preferably are, used for further additions to the main portion of the slurry.

By carrying out the above described process, it is possible to obtain polymeric materials of large particle size and which are substantially free of dusting. It is also possible to obtain polymeric materials having an exceedingly high apparent density as compared to the corresponding polymeric materials which are produced by batch processes.

The initial slurry or suspension of polymeric materials to which the monomer or monomers, inert liquid and catalyst are continuously added and from which the minor portion of slurry or suspension is continuously withdrawn may be prepared in various ways. Thus, it is possible to prepare the slurry or suspension in accordance with the well-known batch processes. For example, it is possible to polymerize the monomers in the inert liquid by heating in the presence of the catalyst without adding additional monomers and without withdrawing or removing polymeric materials, until from about 80 to 95% conversion monomer or monomers to polymeric material is effected.

For convenience of description the processes of the present invention will be described in greater detail with reference to the continuous polymerization of styrene and maleic anhydride monomers, but it is to be understood that the processes described herein are applicable to the polymerization of a large variety of monomers and mixtures of monomers as will be pointed out in greater detail in the following description and the examples. A slurry or suspension of styrene-maleic copolymer in a non-polymerizable, inert hydrocarbon or chlorinated hydrocarbon liquid is first prepared according to the well-known batch processes or, for example, by heating styrene and maleic anhydride monomers dissolved in a suitable hydrocarbon liquid such as benzene containing from about 0.02 to 0.3% of a polymerization catalyst such as benzoyl peroxide until from about 80 to 95% conversion of the monomers to a styrene-maleic anhydride copolymer is obtained. It is convenient to start with a solution containing from about 10 to 20% by weight of the monomers. In most instances it is desirable to obtain a slurry which contains substantially the same molecular proportions of unreacted styrene and maleic anhydride monomers and, since the copolymer generally contains the styrene and maleic anhydride combined in substantially equimolecular proportions, it is preferred to start with a solution containing substantially equimolecular proportions of styrene and maleic anhydride monomers.

After the initial slurry or suspension of styrene-maleic anhydride copolymer in the hydrocarbon or chlorinated hydrocarbon liquid has been formed, additional quantities of styrene and maleic anhydride monomers, hydrocarbon or chlorinated hydrocarbon liquid such as benzene and polymerization catalyst are continuously added to the slurry or suspension of the copolymer. For convenience in operation it is preferred to add a solution containing the hydrocarbon or chlorinated hydrocarbon liquid, the monomers and the catalyst, although each of the ingredients may be added separately if desired. The rate of addition may be varied to a considerable extent depending upon the rate of reaction which is in turn governed by the temperature of the slurry, the polymerization catalyst and the amount thereof used and the mol or weight ratio of styrene to maleic anhydride, and the amount of conversion of monomers to polymer desired. In those instances where it is desired to keep the amount of unreacted monomers in the slurry at a minimum, and to operate at high reaction rates, it is preferred to add the monomers, hydrocarbon or chlorinated hydrocarbon liquid and catalyst at such a rate as to replace from about 7 to 12% by weight of the initial slurry per hour, that is, the additions are preferably made at the rate of about 7 to 12% by weight, based on the initial slurry weight, per hour.

The weight ratio of monomers, hydrocarbon or chlorinated hydrocarbon liquid and catalyst added to the copolymer slurry may be varied considerably. For best results, it is preferable to add these ingredients in such proportions that from 20 to 40 parts by weight of monomers are added for every 80 to 60 parts of hydrocarbon or chlorinated hydrocarbon liquid and 0.02 to 0.3 part of the polymerization catalyst. Thus, when these ingredients are added to the copolymer slurry in the form of a single solution, such solution would preferably comprise from 20 to 40% by weight of monomers, from 80 to 60% by weight of the hydrocarbon or chlorinated hydrocarbon liquid and from 0.02 to 0.3% by weight of the polymerization catalyst.

The weight or mol ratio of styrene to maleic anhydride may be varied considerably, for example, the weight ratio of styrene to maleic anhydride may be varied between 9 parts by weight of styrene to 1 part by weight of maleic anhydride and 1 part by weight of styrene to 1.5 parts by weight of maleic anhydride. It is ordinarily, however, disadvantageous to use excess styrene or excess maleic anhydride, and in most instances it is preferable to add the styrene and maleic anhydride in equimolecular proportions.

The slurry or suspension is heated during the continuous addition thereto of the monomers, hydrocarbon or chlorinated hydrocarbon liquid and catalyst. The temperature of the slurry may be varied considerably depending upon the boiling point of the hydrocarbon or chlorinated hydrocarbon liquid used and the desired molecular weight of the copolymer. In general, it is possible to obtain higher molecular weight copolymers or polymeric materials by carrying out the continuous polymerization at low temperatures, for example, temperatures of 40 to 60° C. However, at such low temperatures the reaction rate is usually slower than at higher temperatures and in such instances the rate of conversion of monomers to copolymer is not as fast as may be desired. In such cases the temperature may be increased by proper selection of the hydrocarbon or chlorinated hydrocarbon liquid, and the desired molecular weight can still be obtained by proper selection of the hydrocarbon liquid or by the use of suitable chain-transfer agents such as the alkyl mercaptans, carbon tetrachloride and the like. In most cases it is not necessary to operate at temperatures in excess of 150° C. High temperature operation, that is, at 150° C. or higher is apt to have some disadvantages, for example, the copolymer might tend to gel and agglomerate with the result that subsequent removal of the liquid constituents from the copolymer particles becomes difficult. When temperatures below the boiling point of the hydrocarbon or chlorinated hydrocarbon liquid are employed it is usually necessary to carry out the polymerization in an atmosphere of an inert gas such as nitrogen or carbon dioxide.

It is preferable to operate the process at the reflux temperature of the mixture of hydrocarbon or chlorinated hydrocarbon liquid and monomers at atmospheric pressure for several reasons. First, the product tends to be more uniform by virtue of the fact that the temperature of the copolymer slurry is uniform under reflux conditions. Secondly, the temperature of the copolymer slurry is easily controlled since the heat supplied to the vessel in which the copolymer slurry is heated does not have to be controlled except within rather wide limits, and only need be supplied in an amount sufficient to cause boiling. Thirdly, by carrying out the reaction under reflux conditions, the heat of reaction is taken away by the escaping vapors which are cooled in a condenser and returned to the slurry. This not only provides an efficient way of removing the heat of reaction, but also eliminates the necessity of carrying out the polymerization in an atmosphere of inert gas.

During the continuous addition of styrene and maleic anhydride monomers, hydrocarbon or chlorinated hydrocarbon liquid and polymerization catalyst to the copolymer slurry in the hydrocarbon or chlorinated hydrocarbon liquid, a minor portion or increment of the copolymer slurry is continuously removed or withdrawn. This may be accomplished in a variety of ways. One very convenient mode of operation is to continuously stir the copolymer slurry in such a manner as to provide a more or less uniform distribution of copolymer particles throughout the slurry and to allow the copolymer slurry to continuously overflow through a suitable pipe or outlet in the slurry container. In this manner the volume of slurry in the container is maintained substantially constant and the amount of slurry withdrawn over any particular increment of time is thus substantially equal to the amount of styrene and maleic anhydride, hydrocarbon or chlorinated hydrocarbon liquid and catalyst added to the copolymer slurry. Another mode of operation consists in continuously withdrawing or removing a minor portion of the slurry at some point below the surface of the copolymer slurry as by gravity flow or by pumping. Still another way of removing a minor portion of the slurry is to use a container having a conical shaped bottom in which the copolymer particles are permitted to settle and removing the settled copolymer and some inert liquid through a suitable pipe or outlet.

The rate of withdrawal or removal of the slurry from the main portion or body of the copolymer slurry in the hydrocarbon or chlorinated hydrocarbon liquid need not necessarily be the same as the rate of addition of the styrene and maleic monomers, the hydrocarbon or chlorinated hydrocarbon liquid and the polymerization catalyst over any particular increment of time. However, for ease of operation and in order to obtain the most uniform copolymer, it is preferred to withdraw or remove the slurry at substantially the same rate as the styrene and maleic anhydride monomers, hydrocarbon or chlorinated hydrocarbon liquid and catalyst are added to the main portion or body of the copolymer slurry.

The copolymer slurry obtained in the manner described above, that is, by removal from the main portion or body of the slurry, consists essentially of particles of styrene-maleic anhydride copolymer, hydrocarbon or chlorinated hydrocarbon liquid, small amounts of polymerization catalyst, and unreacted styrene and maleic anhydride monomers. Usually, the conversion is between about 80 and 95% of the added monomers so that the slurry only contains between about 5 and 20% by weight of the unreacted monomers. The slurry is run through a suitable filtering device such as a plate and frame filter press, or through a centrifuge or the like to separate the copolymer particles from the major portion of the liquid constituents of the slurry. At this stage, that is, after filtration or centrifuging the copolymer cake will normally contain between about 35 and 45% by weight of liquid constituents, primarily the hydrocarbon or chlorinated hydrocarbon liquid. These liquid constituents are substantially removed by steaming the copolymer particles or by bringing the copolymer particles into contact with a stream of hot inert gas, or by heating the copolymer particles in an oven to drive off the liquid constituents by evaporation.

The dry or substantially liquid-free styrene-maleic anhydride copolymer particles are generally or essentially spherical in shape. The particles are substantially dustless and dissolve easily in aqueous alkali solutions. They usually have an apparent density between about 34 and 40 pounds per cubic foot as compared with an apparent density of 13 to 17 pounds per cubic foot for copolymer particles prepared by batch processes. The styrene-maleic anhydride copolymers of this invention generally have an average particle size between about 8 and 80 microns. The major portion of the particles have diameters within the range of 40 to 50 microns. A typical screen analysis of the dry copolymer is as follows: on 80 mesh—3.2%, on 100 mesh—0.8%, on 200 mesh—37.5%, on 325 mesh—16.1%, and through 325 mesh—42.4%.

The particle size of the copolymer particles is largely dependent on such factors as the hydrocarbon or chlorinated hydrocarbon liquid used, the temperature at which the process is carried out, the monomer composition and concentration, the type and amount of catalyst used, and the use or non-use of modifying agents such as cross-linking agents, as for example, the maleic or fumaric esters of polyhydric alcohols, diisopropenyl benzene, divinyl benzene or the like, and chain-transfer agents, as, for example, alkyl mercaptans such as dodecyl mercaptan, carbon tetrachloride or the like. By proper selection and use of these factors, it is possible to vary the particle size of the copolymer within certain limits. In general, by using slow reaction rates and low concentrations of monomer plus copolymer in the copolymer slurry, it is possible to obtain larger or coarser copolymer particles.

Depending upon the conditions of operation, for example, the hydrocarbon or chlorinated hydrocarbon liquid and temperatures used, it is also possible to obtain copolymers of low or high molecular weight. The viscosity of a solution of the copolymer is an indication of the molecular weight of the copolymer. In the absence of cross-linking agents it has been possible to produce copolymers in accordance with this invention which when dissolved to the extent of 5% in a water solution of sodium hydroxide at a pH of 8 and a temperature of 25° C. have a viscosity of 5 to 85 centipoises. When cross-linking agents are employed, however, the viscosity may be much higher, up to or just below the point where the polymer becomes insoluble.

The terms "non-polymerizable, inert hydrocarbon liquid" or "hydrocarbon liquid" as used herein are intended to cover hydrocarbon liquids which boil above 50° C., and preferably between 80 and 150° C. As examples of such liquids may be mentioned the aromatic hydrocarbons as, for example, benzene, toluene, xylene and the like; alkanes having a boiling point above 50° C., and preferably between 80 and 150° C., such as heptane, hexane, octane, nonane and the like; cyclo alkanes having a boiling point above 50° C., and preferably between 80 and 150° C., such as cyclohexane and cyclopentane and the like; and mixtures of such hydrocarbons. The terms "non-polymerizable, inert chlorinated hydrocarbon liquid" or "chlorinated hydrocarbon liquid" as used herein are intended to cover chlorinated hydrocarbon liquids which boil above 50° C., and preferably between 80 and 150° C. As examples of such liquids may be mentioned the chlorinated aromatic hydrocarbons as, for example, chlorobenzene, dichlorobenzene, chloro-toluene and the like; chlorinated alkanes having a boiling point above 50° C., and preferably between 80 and 150° C., such as ethylene dichloride, carbon tetrachloride and the like; mixtures of such chlorinated hydrocarbons; and mixtures of such chlorinated hydrocarbons and the hydrocarbon liquids described above. Benzene enables the preparation of higher molecular weight copolymers than is possible with the use of toluene or xylene. Mixtures of benzene and the above mentioned alkanes are particularly suitable for producing lower molecular weight copolymers. When using the higher boiling aromatic hydrocarbon liquids such as toluene or xylene it is often desirable to use such liquids together with the low boiling alkanes of the type described above such as heptane or hexane when lower molecular weight copolymers are desired, particularly when the process is operated at reflux temperatures. It is preferable to employ aromatic hydrocarbons containing from 6 to 9 carbon atoms, or chlorinated hydrocarbons containing from 6 to 9 carbon atoms and not more than 2 chlorine atoms, alkanes containing from 5 to 10 carbon atoms or chlorinated alkanes containing from 2 to 5 carbon atoms and not more than 4 chlorine atoms.

Generally, the alkanes do not dissolve substantial quantities of maleic anhydride and when such monomer is employed it is preferred to use other hydrocarbon liquids or mixtures of the above described alkanes and other hydrocarbon liquids such as the aromatic hydrocarbons.

It is possible to use vinyl compounds other than styrene in the processes hereinbefore described. For example, it is possible to replace the styrene completely or partially with liquid vinyl compounds such as vinyl acetate, vinyl ethers, divinyl benzene, p-chloro styrene, p-methyl styrene and the like. It is also possible to use gaseous vinyl compounds having a single vinyl group and which are readily soluble in the hydrocarbon or chlorinated hydrocarbon liquid as, for example, vinyl chloride, providing the process is carried out under pressure in a suitable pressure resistant vessel. The maleic anhydride may be replaced completely or partially by hydrocarbon soluble ethylene $\alpha,\beta$ dicarboxylic anhydrides such as itaconic anhydride or citraconic anhydride, or by unsaturated alkylene mono-carboxylic acids such as acrylic acid or methacrylic acid, or the maleic anhydride may be replaced to the extent of 50% by weight of alkyl esters of maleic acid containing from 1 to 10 carbon atoms in the alkyl group, particularly the alkyl half esters of maleic acid. Particularly valuable terpolymers are prepared by using a mixture of styrene, maleic anhydride and acrylic acid and/or methacrylic acid. Particularly suitable proportions of these monomers consist of 40 to 65% by weight of methacrylic acid or acrylic acid, 15 to 40% by weight of styrene and 10 to 30% of maleic anhydride.

It is also possible according to the processes of this invention to prepare homopolymers of acrylic acid, methacrylic acid, acrylamide, methacrylamide and other polymerizable unsaturated compounds containing polar groups as, for example, carboxyl, carboxylic anhydride, amide and nitrile groups. Such monomers are normally soluble in one of the inert hydrocarbon or chlorinated hydrocarbon liquids and the homopolymers prepared therefrom are normally insoluble and substantially non-swellable in such hydrocarbon or chlorinated hydrocarbon liquids.

It is to be understood that the invention is not limited to the continuous polymerization of the specific unsaturated compounds named herein or to the use of a non-polymerizable, inert hydrocarbon or chlorinated hydrocarbon liquid, since it is possible to obtain similar results by using other polymerizable unsaturated organic compounds in such inert hydrocarbon or chlorinated hydrocarbon liquids or in other non-polymerizable inert liquids which are solvents for the monomer or monomers but are non-solvents and substantially non-swelling media for polymeric materials derived from such unsaturated compounds.

In general, it is possible to prepare homopolymers, copolymers and heteropolymers having substantially the same particle size characteristics, freedom from dusting, and apparent density as the copolymers prepared from styrene and maleic anhydride, by proper selection of a non-polymerizable, inert liquid, temperature, type and amount of catalyst etc.

A large variety of polymerization catalysts may be used in the processes of this invention depending on the monomer or monomers used and other factors. As examples of catalysts which are generally suitable may be mentioned the free radial catalysts or initiators such as dialkyl disulfides such as diamyl disulfide, ditertiary dodecyl disulfide and the like; azo compounds such as α,α' azo bis isobutyronitrile and the like; perbenzoates such as ditertiary butyl perbenzoate; dialkyl peroxides such as ditertiary butyl peroxide, ditertiary amyl peroxide, diethyl peroxide and the like; and some acyl peroxides such as lauroyl peroxide, benzoyl peroxide and the like; and hydroperoxides such as tertiary butyl hydroperoxide and cumene hydroperoxide.

One of the important advantages of the continuous polymerization processes of this invention, in addition to those hereinbefore disclosed, is that these processes may facilitate in some cases, production of copolymers in a large variety of ratios of the various comonomers. Thus, it is possible to add continuously monomers of the desired polymer composition, but the actual monomer ratios in the polymer slurry could be different from this, as needed, to form the desired polymer. The filtrate and washings from separated polymer slurry would contain the unreacted monomers of this different composition necessary for production of the desired polymer.

A further understanding of the present invention will be obtained from the following specific examples which are intended to illustrate the invention but not to limit the scope thereof, parts and percentages being by weight.

*Example*

A solution containing 5% methacrylic acid, 0.05% benzoyl peroxide and 94.95% benzene was heated at refluxing temperature (about 82° C.) in a vessel equipped with a stirrer and reflux condenser until a polymer haze developed, after which a solution containing 24% of methacrylic acid, 0.2% of benzoyl peroxide and 75.8% of benzene was added continuously to the initial homopolymer slurry at the rate of 8% per hour, based on the weight of the initial homopolymer slurry in the reaction vessel. The homopolymer slurry was stirred vigorously and sufficient heat was continuously supplied to maintain gentle refluxing of the benzene in the slurry. Homopolymer slurry was continuously removed from the vessel through an overflow pipe at substantially the same rate that the monomer solution was added. The homopolymer in the overflow slurry was separated from the liquid constituents of the slurry by filtration, after which the filter cake was washed with benzene and then dried in a current of hot air at a temperature of 100° C.

Conversion of methacrylic acid to the homopolymer of methacrylic acid over a period of 72 hours averaged between 85 and 90%. The apparent or bulk density of the homopolymer, which was free-flowing and substantially dustless, was about 25 pounds per cubic foot.

A continuous polymerization process was carried out substantially in the same manner as described immediately above except that acrylic acid was used instead of methacrylic acid. The product obtained was similar to that obtained with methacrylic acid.

The homopolymers of acrylic acid and methacrylic acid are soluble in water and aqueous solutions thereof may be used for sizing nylon. In general, the particles of these homopolymers have a bulk or apparent density between about 20 and 30 pounds per cubic foot compared to a bulk density of about 8 to 15 pounds per cubic foot for the corresponding homopolymers prepared by batch processes.

The products produced in accordance with the continuous processes of this invention have a wide variety of uses. They may, in general, be dissolved in suitable solvents used in the coating art as, for example, the ketones for example, acetone and then applied to fabrics, metals, wood or the like for the purpose of providing protective coatings. The copolymers which are soluble in water or aqueous alkali solutions are particularly suitable for use in the textile industry.

Various changes and modifications may be made in the operation of the processes described herein. Thus, if more complete conversion of the monomers is desired a number of reactors may be used in series and fresh catalyst or modifier may be added to the reactors following the initial reactor in order to alter the rate of reaction or the polymer properties.

This application is a continuation-in-part of my copending application Serial No. 170,955, filed June 28, 1950, now U.S. Patent 2,675,370.

What is claimed is:

1. A method of continuously preparing homopolymers which comprises continuously adding a polymerization catalyst, a non-polymerizable inert liquid and a monomer to a slurry of a homopolymer of said monomer in some of the same inert liquid, continuously maintaining the temperature of said slurry sufficiently high to effect polymerization of said monomer in the slurry, thereby forming additional homopolymer from said monomer, and continuously removing a minor portion of the slurry from the bulk of the slurry, said monomer being a member of the group consisting of acrylic and methacrylic acids, said inert liquid being a non-solvent and substantially non-swelling medium for said homopolymer and being selected from the group consisting of hydrocarbons having a boiling point above 50° C. and chlorinated hydrocarbons having a boiling point above 50° C.

2. A method of continuously preparing a homopolymer of acrylic acid which comprises continuously adding a free radical initiator, a non-polymerizable, inert liquid and acrylic acid to a slurry of polyacrylic acid in said inert liquid, said inert liquid being a non-solvent and substantially non-swelling medium for said polyacrylic acid and being selected from the group consisting of hydrocarbons havinga boiling point above 50° C. and chlorinated hydrocarbons having a boiling point above 50° C., continuously maintaining the temperature of said slurry sufficiently high to effect polymerization of said acrylic acid, thereby forming additional polyacrylic acid, and continuously removing a minor portion of the slurry from the bulk of the slurry.

3. A process as in claim 2, but further characterized in that said inert liquid is an aromatic hydrocarbon.

4. A process as in claim 2, but further characterized in that said inert liquid is benzene.

5. A process as in claim 2, but further characterized in that the minor portion of slurry is removed from the bulk of the slurry at such a rate that the volume of the bulk of the slurry remains substantially constant.

6. A process of continuously polymerizing acrylic acid which comprises continuously adding a free radical polymerization catalyst, a non-polymerizable, inert hydrocarbon liquid having a boiling point between 80 and 150° C. and acrylic acid in a weight ratio of 0.02 to 0.3 part of catalyst to 80 to 60 parts of said liquid to 20 to 40 parts of acrylic acid, to a slurry of polyacrylic acid in said inert liquid, which slurry contains additionally unreacted acrylic acid and a free radical polymerization catalyst, said continuous addition of catalyst, inert liquid and acrylic acid being made at the rate of 7 to 12% by weight per hour, based on the weight of the initial slurry, said inert liquid being a non-solvent and substantially non-swelling medium for polyacrylic acid, continuously maintaining the slurry at the reflux temperature while refluxing said inert liquid, thereby forming additional quantities of polyacrylic acid, and continuously removing a portion of the slurry from the bulk of the slurry at a rate sufficient to maintain the volume of the bulk of the slurry substantially constant.

7. A process as in claim 6, but further characterized in that said inert liquid is benzene.

8. A method of continuously preparing a homopolymer of methacrylic acid which comprises continuously adding a free radical initiator, a non-polymerizable inert liquid and methacrylic acid to a slurry of a homopolymer of methacrylic acid in some of the same inert liquid, continuously maintaining the temperature of said slurry sufficiently high to effect polymerization of said methacrylic acid, thereby forming additional homopolymer of methacrylic acid, and continuously removing a minor portion of the slurry from the bulk of the slurry, said inert liquid being a non-solvent and substantially non-swelling medium for said methacrylic acid homopolymer and being selected from the group consisting of hydrocarbons having a boiling point above 50° C. and chlorinated hydrocarbons having a boiling point above 50° C.

9. A process as in claim 8, but further characterized in that said inert liquid is an aromatic hydrocarbon.

10. A process as in class 8, but further characterized in that said inert liquid is benzene.

11. A process as in claim 8, but further characterized in that the minor portion of slurry is removed from the bulk of the slurry at such a rate that the volume of the bulk of the slurry remains substantially constant.

12. A process of continuously polymerizing methacrylic acid which comprises continuously adding a free radical polymerization catalyst, a non-polymerizable, inert hydrocarbon liquid having a boiling point between 80 and 150° C. and methacrylic acid in a weight ratio of 0.02 to 0.3 part of catalyst to 80 to 60 parts of said liquid to 20 to 40 parts of methacrylic acid, to a slurry of polymethacrylic acid in said inert liquid, which slurry contains additionally unreacted methacrylic acid and a free radical polymerization catalyst, said continuous addition of catalyst, inert liquid and methacrylic acid being made at the rate of 7 to 12% by weight per hour, based on the weight of the initial slurry, said inert liquid being a non-solvent and substantially non-swelling medium for polymethacrylic acid, continuously maintaining the temperature of the slurry at the reflux temperature while refluxing said inert liquid, thereby forming additional quantities of polymethacrylic acid, and continuously removing a portion of the slurry from the bulk of the slurry at a rate sufficient to maintain the volume of the bulk of the slurry substantially constant.

13. A process as in claim 12, but further characterized in that said inert liquid is benzene.

References Cited in the file of this patent

UNITED STATES PATENTS

| | | |
|---|---|---|
| 2,135,443 | Strain | Nov. 1, 1938 |
| 2,375,256 | Soday | May 8, 1945 |
| 2,587,562 | Wilson | Feb. 26, 1952 |
| 2,675,370 | Barrett | Apr. 13, 1954 |

FOREIGN PATENTS

| | | |
|---|---|---|
| 304,681 | Great Britain | Feb. 3, 1930 |
| 753,045 | France | July 31, 1933 |